United States Patent
Pedersen et al.

(10) Patent No.: US 12,247,689 B2
(45) Date of Patent: Mar. 11, 2025

(54) FIRE RESISTANT VENTILATION DUCT AND A METHOD OF MANUFACTURING AND INSTALLING SUCH VENTILATION DUCT

(71) Applicant: ROCKWOOL A/S, Hedehusene (DK)

(72) Inventors: Kurt Munk Pedersen, Hedehusene (DK); Jürg Dieter Stefan Rödenberger, Hedehusene (DK); Markus Thoma, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 343 days.

(21) Appl. No.: 17/783,751

(22) PCT Filed: Dec. 11, 2020

(86) PCT No.: PCT/EP2020/085771
§ 371 (c)(1),
(2) Date: Jun. 9, 2022

(87) PCT Pub. No.: WO2021/116411
PCT Pub. Date: Jun. 17, 2021

(65) Prior Publication Data
US 2023/0003333 A1    Jan. 5, 2023

(30) Foreign Application Priority Data
Dec. 12, 2019   (EP) .................................. 19215568

(51) Int. Cl.
*F16L 57/04*    (2006.01)
*F16L 5/04*    (2006.01)
(Continued)

(52) U.S. Cl.
CPC ................. *F16L 57/04* (2013.01); *F16L 5/04* (2013.01); *F16L 9/003* (2013.01); *F16L 9/17* (2013.01);
(Continued)

(58) Field of Classification Search
CPC ... F16L 57/04; F16L 5/04; F16L 9/003; F16L 9/17; F16L 59/04; F16L 59/121;
(Continued)

(56) References Cited

U.S. PATENT DOCUMENTS

2012/0100319 A1    4/2012   Keller et al.

FOREIGN PATENT DOCUMENTS

| DE | 2841651 A1 | 4/1980 |
|---|---|---|
| EP | 2350512 A2 | 8/2011 |

(Continued)

OTHER PUBLICATIONS

International Search Report dated Feb. 16, 2021; International Application PCT/EP2020/085771.

*Primary Examiner* — David R Deal
(74) *Attorney, Agent, or Firm* — DINSMORE & SHOHL LLP

(57) ABSTRACT

A ventilation duct for a fire rated ventilation duct wall penetration has one or more metal sheets forming said duct, wherein said metal sheet duct is covered on the outside by a heat insulating material, and said duct includes elongated stiffening members located on the outside of the duct and attached to said metal sheets. The stiffening members each comprises a metal profile and at least one non-combustible bar of inorganic material. The metal profile is fixed to the metal sheet of the duct and retains the non-combustible bar by at least partly encircling the bar.

31 Claims, 4 Drawing Sheets

(51) Int. Cl.
| | |
|---|---|
| *F16L 9/00* | (2006.01) |
| *F16L 9/17* | (2006.01) |
| *F16L 59/04* | (2006.01) |
| *F16L 59/12* | (2006.01) |
| *F16L 59/14* | (2006.01) |
| *F24F 11/33* | (2018.01) |
| *F24F 13/02* | (2006.01) |

(52) U.S. Cl.
CPC .............. *F16L 59/04* (2013.01); *F16L 59/121* (2013.01); *F16L 59/143* (2013.01); *F16L 59/145* (2013.01); *F24F 11/33* (2018.01); *F24F 13/0245* (2013.01); *F24F 13/0263* (2013.01); *F24F 2221/30* (2013.01)

(58) Field of Classification Search
CPC ........ F16L 59/143; F16L 59/145; F24F 11/33; F24F 13/0245; F24F 13/0263; F24F 2221/30
See application file for complete search history.

(56) References Cited

FOREIGN PATENT DOCUMENTS

| | | |
|---|---|---|
| EP | 2024689 B1 | 8/2015 |
| GB | 2394541 A | 4/2004 |
| WO | 2006089538 A1 | 8/2006 |

FIRE RESISTANT VENTILATION DUCT AND A METHOD OF MANUFACTURING AND INSTALLING SUCH VENTILATION DUCT

CROSS-REFERENCE TO RELATED APPLICATIONS

This application is the U.S. National Stage of PCT/EP2020/085771 filed on Dec. 11, 2020, which claims priority to European Patent Application 19215568.7 filed on Dec. 12, 2019, the entire content of both are incorporated herein by reference in their entirety.

FIELD OF THE INVENTION

The present invention relates to a ventilation duct for a fire rated ventilation duct wall penetration, said ventilation duct comprising one or more metal sheets forming said duct, wherein said metal sheet duct is covered on the outside by a heat insulating material, and said duct includes elongated stiffening members located on the outside of the duct and attached to said metal sheets. A ventilation duct of such kind is known from EP 2 024 689 B 1.

BACKGROUND OF THE INVENTION

Fire regulations require that a tight seal be established in the area where the section of the ventilation duct passes through a fire rated wall and/or deck such that flames, smoke and/or toxic gases largely will not pass from one building area to the adjoining building area in case of fire in one of the areas. DIN 4102 Part 4 requires the provision of vertical internal stiffening pipes and, as the case may be, a round-going stiffening frame made up from an L-shaped profile with one leg lying flatly against the metal sheet outer surface. The mounting of the aforementioned vertical pipes inside the duct is time-consuming and also restricts the free flow of air through the ventilation/smoke exhaust duct in normal operation. Moreover, it has been found that the aforementioned stiffening L-shaped frame often applied may in fact in certain cases bring about a further loss of seal between the duct section and the wall. A metal sheet ventilation duct is known from document GB-2394541-A.

EP 2 024 689 B1 describes a solution wherein bar members are arranged at a distance from the ventilation duct itself, so that they are less exposed to the heat of fire if it occurs inside the ventilation duct. In the prior art cited above the L-shaped profile tends to be heated un-evenly and thereby tends to force the ventilation duct wall to bend inwardly with a risk of providing an opening through the wall and/or deck. By moving the bar members further out as in EP 2 024 689 B1, this risk is considerably reduced and it is thereby possible to maintain the structural stability of the ventilation duct during a fire.

The arrangement described in EP 2 024 689 B1 is made on the building site after the ventilation duct is installed through a wall opening. First, insulating material, such as stone wool slabs, is arranged around the ventilation duct and through the wall opening. Then, the stiffening bar members are mounted on the outside of the insulating material as described above and connected to the ventilation duct by screws extending through the insulation. Finally, the stiffening bar members are covered by further insulating material, which also abuts the wall and/or deck.

SUMMARY OF THE INVENTION

A disadvantage with this arrangement is that often there is little room for installation of the stiffening bar members, in particularly if the ventilation duct is located close to the ceiling and/or a wall. Sometimes it is even impossible, and another solution must be chosen.

It is therefore an object for the present disclosure to provide a ventilation duct and a method of installing same which is suitable for installation where there is little room for installation in an opening in a building structure, such as a wall and/or a deck.

In a first aspect, the invention consists of a ventilation duct of the initially mentioned kind, wherein the stiffening members each comprise a metal profile and at least one non-combustible bar of inorganic material, wherein the metal profile is fixed to the metal sheet of the duct and retaining the non-combustible bar of inorganic material. Advantageously, the metal profile is retaining the non-combustible bar by at least partly encircling the bar. In this specification the term "inorganic materials" means a non-metallic material having a main component of a mineral material.

In a second aspect of the invention there is provided a method of manufacturing and installing a ventilation duct in a fire rated ventilation duct wall penetration, said method comprising the steps of:
providing a ventilation duct section comprising one or more metal sheets forming said duct section,
mounting elongated stiffening members located on the outside of the duct section and attached to said metal sheets, wherein the stiffening members each comprises a metal profile and at least one non-combustible bar of inorganic material, wherein the profile is fixed to the metal sheet of the duct section and retaining the non-combustible bar by at least partly encircling the bar, and
positioning the duct section with stiffening members through an opening in a building structure, such as a partitioning wall, a deck or a floor,
covering said metal sheet duct section and the stiffening members with the non-combustible bars by a heat insulating material, and
sealing the gap between the outer surface of the insulation material and the opening in the building structure.

By the present invention there is provided a solution wherein the stiffening members are attached to the ventilation duct itself before it is finally installed through the building opening. The stiffening bar members comprise steel profiles combined with bars made of a non-combustible inorganic material, such as gypsum, calcium silicate, cement or other fire rated mineral materials. Hereby, the ventilation duct can be prepared for installation at a location where there is sufficient space and then taken to the location of installation and fitted in the building structure opening.

This means that the disadvantages associated with little room for installation of the members, in particularly if the ventilation duct is located close to the ceiling and/or a wall, can be eliminated.

In the preferred embodiment, the stiffening members extend transversely to the longitudinal extension of the duct. However, it is realised that other orientations may be provided, such as at an oblique angle, if the ventilation duct extends through the deck or wall at such an oblique angle. Advantageously, the orientation of the stiffening members is parallel to the deck and/or wall.

In a preferred embodiment of the invention, the metal profile is U-shaped with exterior mounting flanges so that a longitudinal groove is provided which is configured to tightly receiving the at least one non-combustible bar, preferably two non-combustible bars.

The stiffening members are fastened to the metal sheet duct preferably by a plurality of rivets and/or screws. Hereby, a simple mounting of the stiffening bars may be provided which is quick to apply and inexpensive. In a preferred embodiment, the at least one non-combustible bar is glued to the metal profile. The stiffening bar is hereby easier to handle during mounting when the components making up the stiffening bar are secured to each other.

Preferably, the metal profile is a steel profile. Furthermore, the at least one non-combustible bar is preferably based on gypsum, calcium silicate or cement. Stiffening members comprising steel profiles and gypsum bars are preferred, since gypsum comprises a high amount of water that is liberated during a fire and thereby adds in cooling the structure in case of fire. As indicated above, the non-combustible bar is advantageously made of a solid material, essentially without porosity or with limited porosity, which is different from a heat insulating material, such as the heat insulating material surrounding the duct. In a preferred embodiment of the disclosure, the at least one non-combustible bar does not comprise a heat insulation material.

Advantageously, the heat insulating material is also arranged on the outside of the stiffening members. This ensures better thermal insulation and thereby better fire retarding properties, in particular if the heat insulating material is mineral wool, and preferably stone wool.

By the invention it is realised that the penetration of the ventilation duct may be through a separating building structure, which is either vertical or horizontal in orientation. For example, the ventilation duct may be essentially horizontally oriented and penetrate a vertically oriented building structure, such as a partitioning wall. Alternatively, or additionally, the ventilation duct may be essentially vertically oriented and penetrate a horizontally oriented building structure, such as a deck, floor or ceiling.

When the ventilation duct is installed through an opening in the building structure, a gap will often occur between the outer surface of the insulation material and an opening in the building structure. This gap is then sealed, preferably with an intumescent material which is capable of swelling when exposed to heat.

In the present disclosure it is understood that the term ventilation duct includes all kinds of duct for transferring gasses, including a smoke exhaust duct.

In the present disclosure, the term "wall penetration" is meant to mean penetration through an opening of any building structure, such as a partitioning wall, a deck or a floor or ceiling.

The ventilation duct may have any suitable shape, such as circular, flat oval, oval, square, or rectangular in cross-sectional view. For simple fabrication and mounting of the stiffening members, the ventilation duct advantageously has a square or rectangular cross-section.

The number and location of the stiffening members affect the efficiency of the stiffening members. For example, increasing the number of stiffening members, and/or locating the stiffening members around a larger fraction of the perimeter of the duct, may further reduce the risk of bending/twisting of the duct wall during fire, and thereby reduce the risk of creating an opening around the penetrated wall, deck, floor or ceiling. It was found advantageously that the ventilation duct comprises at least one, and more preferably at least two or more stiffening members. In a further preferred embodiment, the stiffening members extend around the entire perimeter of the duct, such that for a square or rectangular cross-sectional duct, the duct comprises four stiffening members.

Further preferably, for ducts having a rectangular cross-section, it is found advantageous that the stiffening member is located or extends along at least one of the longer rectangular sides, and preferably the duct comprises at least two stiffening members located along the two opposing longer sides of the rectangular duct.

The stiffening members are advantageously located on both sides of the wall penetration. However, for ventilation ducts less prone to bending/twisting during fire, such as vertically oriented ventilation ducts, it was found efficient that the one or more stiffening members are located on only one side of the wall penetration, such as on the upper side of the wall penetration. In a preferred embodiment, the ventilation duct is essentially vertically oriented, and the at least one stiffening member, or preferably the at least two stiffening members, are located on the upper side of the wall penetration. As such, in case of a vertically oriented duct, the penetration is likely through a deck, floor or ceiling.

BRIEF DESCRIPTION OF THE DRAWINGS

In the following the invention is described in more detail with reference to the accompanying drawings, in which.

DETAILED DESCRIPTION OF THE INVENTION

Figure 1:
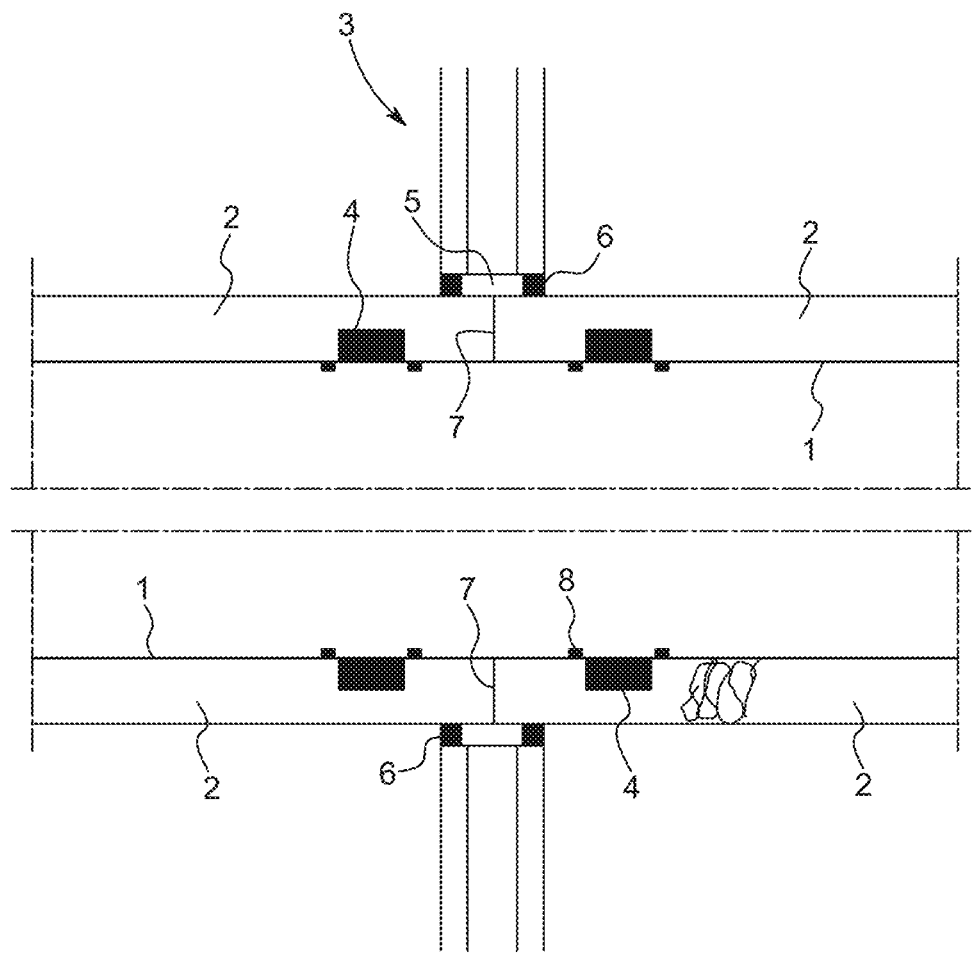
FIG. 1 is a schematic cross-sectional side view of a ventilation duct according to the invention installed in a wall penetration.

The invention is described below with the help of the accompanying figures.

It would be appreciated by the people skilled in the art that the same feature or component of the device are referred with the same reference numeral in different figures. A list of the reference numbers can be found at the end of the detailed description section.

Figure 4:
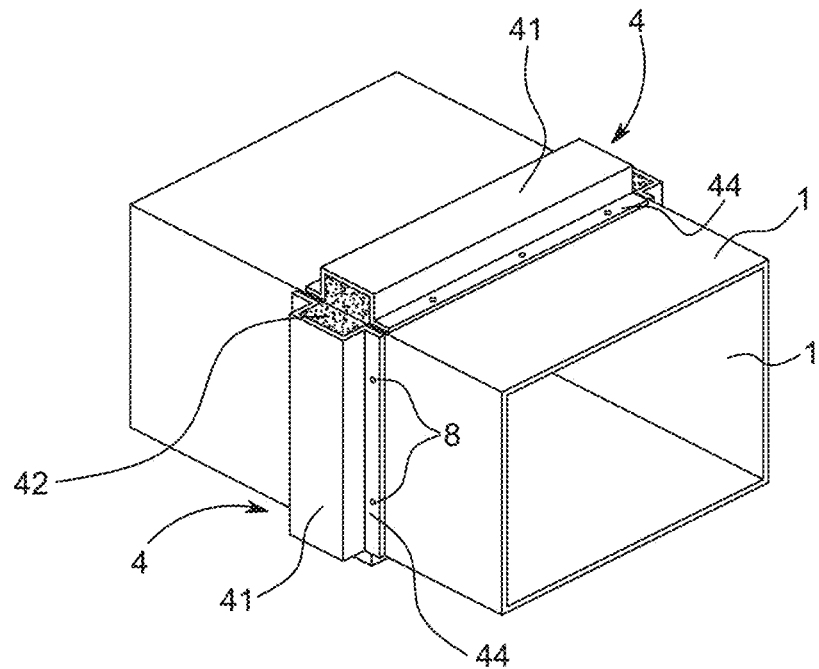
FIG. 4 is a perspective view of a section of a ventilation duct with stiffening members according to the first embodiment of the invention.

With reference to the figures, a ventilation duct according to an embodiment of the invention is shown. The ventilation duct section shown in FIG. 1 is installed penetrating a vertically oriented light wall 3 of a building structure. As shown in FIG. 4, the ventilation duct 1 has a rectangular cross-sectional shape formed with one or more metal sheets bent into shape for forming the duct. On each of the side walls of the ventilation duct 1 there are mounted stiffening members 4. The stiffening members are provided on the ventilation duct positioned on each side of the wall 3 as shown in FIG. 1.

The ventilation duct 1 is covered by heat insulation slabs 2 that also extends through the wall opening. The heat insulating material is mineral wool, preferably stone wool.

In the opening of the wall 3 through which the ventilation duct 1 is installed, a gap will occur between the outer surface of the insulation material 2 and the opening in a building structure. This gap is filled with a strip of loose insulation fibrous wool material 5 and sealed on both sides with an intumescent material 6, which is capable of swelling when exposed to heat.

The insulation slabs 2 abutting each other longitudinally in the section of wall penetration are glued together for providing an airtight seal 7 between two abutting insulation slabs 2. This is advantageous since an airtight seal will prevent any draft of air and gasses to pass through the insulation material in case of a fire. Thus, the airtight seal 7 can prevent a fire from spreading from one side of the wall to the other. To prevent any fire risk, the glue is a non-combustible adhesive, based on e.g. cement or a ceramic adhesive.

Figure 2:
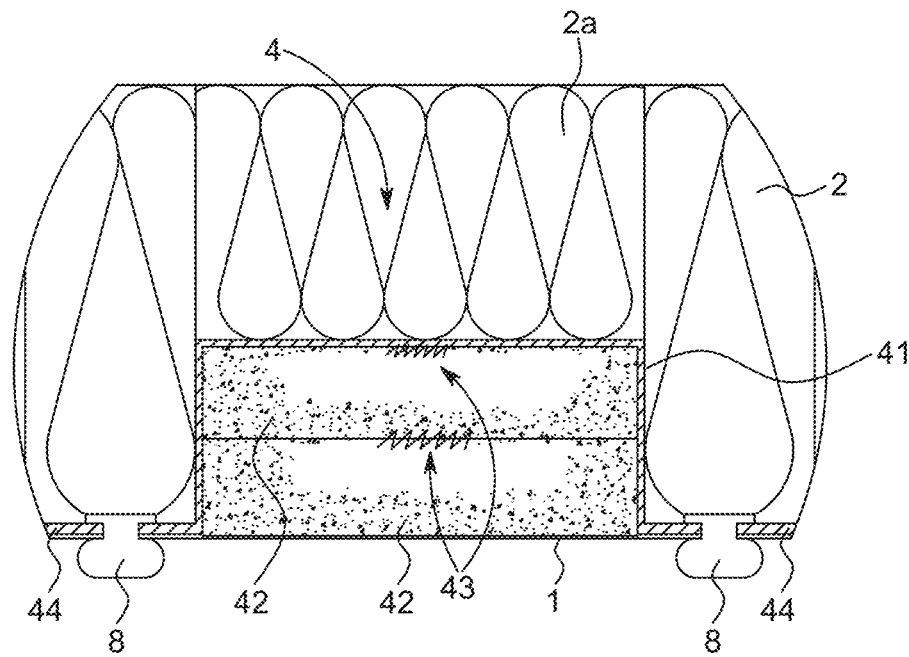
FIG. 2 is a detailed cross-sectional view of a stiffening member according to a first embodiment of the invention.
Figure 3:
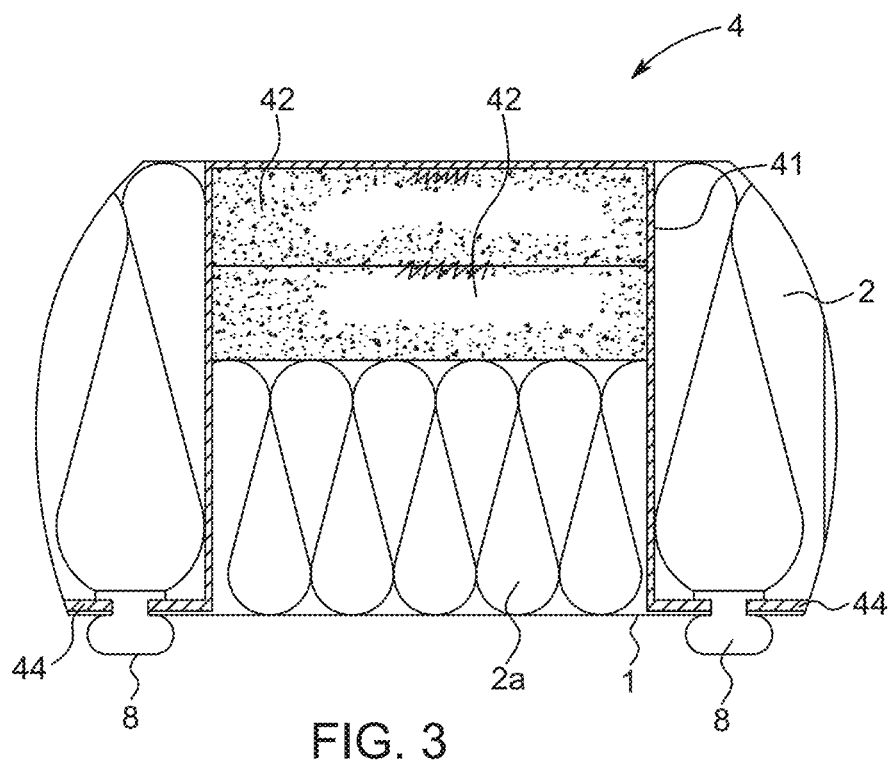
FIG. 3 is a detailed cross-sectional view of a stiffening member according to a second embodiment of the invention.

In FIGS. 2 and 3 two embodiments of the stiffening members 4 are shown. Common for these two embodiments is that the stiffening members 4 each comprise a metal profile 41 and one or more non-combustible bars 42 of inorganic material and that the metal profile 41 is fixed to the metal sheet of the ventilation duct 1 by rivets 8 or the like and thereby retaining the non-combustible bars 42 by partly encircling the bars. The metal profile 41 is preferably a steel profile.

In both the embodiments shown in FIGS. 2 and 3, the stiffening member 4 comprises a metal profile 41, which is U-shaped with exterior mounting flanges 44 so that a longitudinal groove is provided.

In the embodiment shown in FIG. 2, the metal profile 41 is shaped and configured to receive one or more non-combustible bars 42, that essentially fill out the groove. The non-combustible bars 42 are attached to the metal profile respectively to each other by glue 43. On the outside of the stiffening member 4 a layer of insulation material 2a is provided so that the outer surface thereof is essentially flush with the outer surface of the insulation material 2 surrounding the other portions of the ventilation duct. Hereby it is ensured that the cross-section area around the stiffening members 4 is the same as for the rest of the ventilation duct and thereby facilitates the installation of the ventilation duct in a building opening.

In the embodiment of FIG. 3, the metal profile 41 has a height similar to the insulation material 2 surrounding the ventilation duct metal plates 1. In the groove two non-combustible bars 42 are provided in a tightly fit and in the remaining space in the groove there is provided a strip of insulation material 2a. The metal profile 41 is fixed to the metal plates of the ventilation duct 1 by fasteners 8, such as rivets.

The duct section may be prepared for installation off-site where there is plenty of space. The metal ventilation duct 1 is provided with stiffening members 4 by assembling the components of the stiffening members 4, whereby the metal profile 41 is fitted with the non-combustible bars 42 and then positioned on the outer metal sheet of the ventilation duct 1. Through the metal flanges 44 and the metal sheet of the ventilation duct 1, holes may be drilled for the fasteners 8 to obtain a ventilation duct section as shown in FIG. 4. This ventilation duct section is then fitted in the building structure opening and finally provided with insulation material (not shown in FIG. 4).

Figure 5:
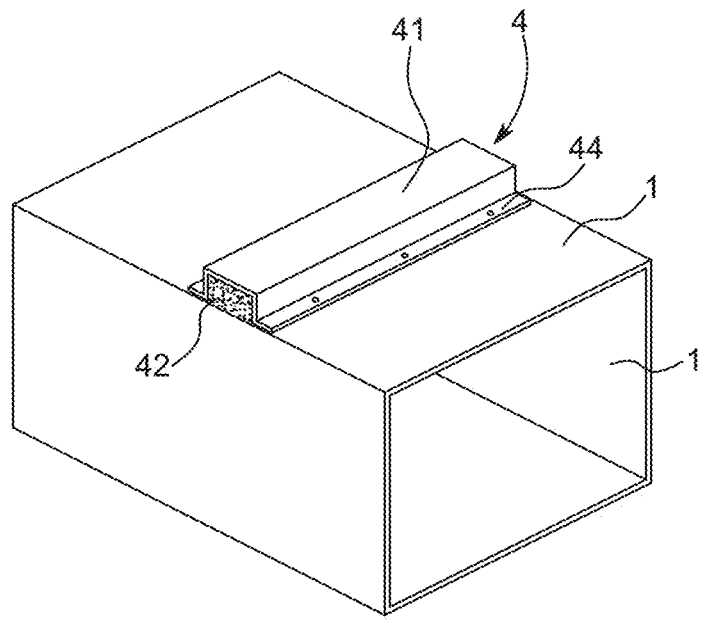
FIG. 5 is a perspective view of a section of a ventilation duct according to the present disclosure, including two stiffening members placed along the longitudinal sides of the duct.

FIG. 5 shows a perspective view of another embodiment of a section of a ventilation duct according to the present disclosure. In this embodiment of the disclosure, the ventilation duct 1 has a rectangular cross-section, and comprises two stiffening members 4 located along the two opposing longitudinal sides of the duct (only the stiffening member on the upper side is seen in FIG. 5).

Figure 6:
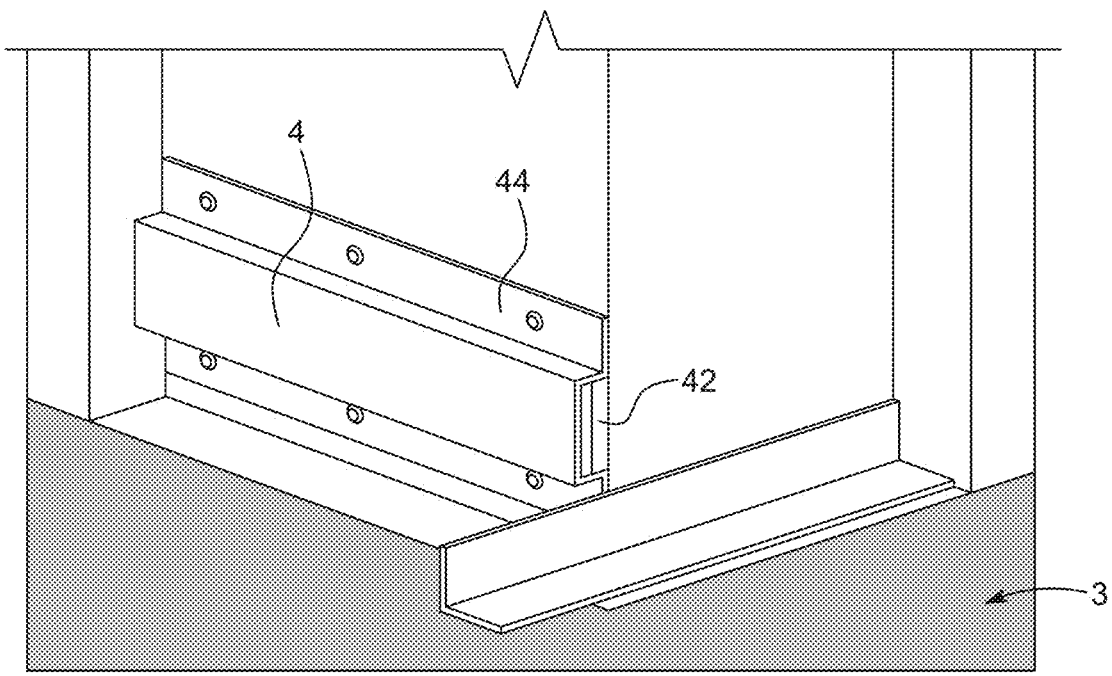
FIG. 6 is a perspective view of a section of a ventilation duct according to the present disclosure, installed in a wall.

FIG. 6 also shows a perspective view of a section of a ventilation duct according to the present disclosure, where the duct has a rectangular cross-section. The duct is further exemplified to be vertically oriented and installed in a wall 3, more specifically a deck, floor or ceiling, which is penetrated by the duct. The ventilation duct 1 comprises two stiffening members 4 located along the two opposing longitudinal sides of the duct (only the stiffening member on the front side is seen in FIG. 6). On the two opposing short sides of the duct, one or more constructional profiles may be provided. Optionally, the constructional profiles may be any L-shaped profile with one leg abutting the metal sheet outer surface. Those profiles form part of the mounting and bearing system for the duct to be installed in the penetration.

Figure 7:
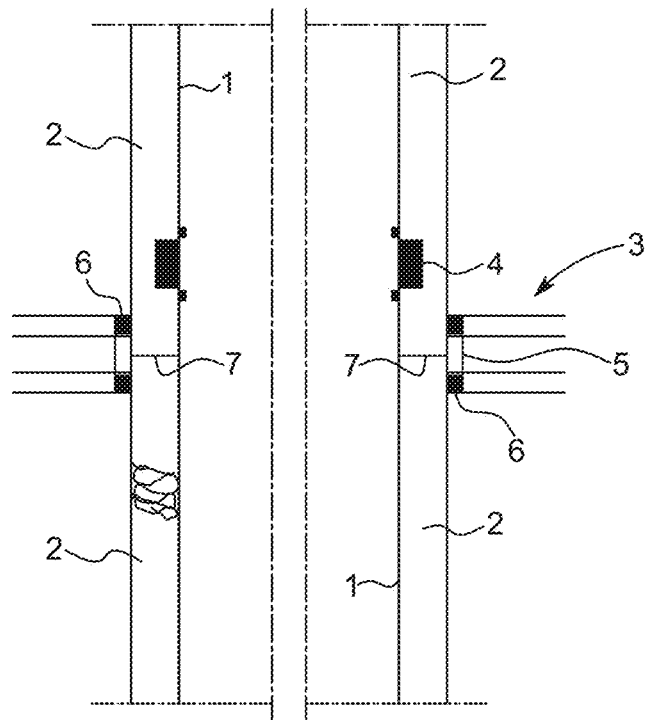
FIG. 7 is a schematic cross-sectional side view of a ventilation duct according to the present disclosure installed in a wall.

FIG. 7 shows a schematic cross-sectional side view of the ventilation duct shown in FIG. 6, which is installed in a wall 3, more specifically penetrating a deck, floor or ceiling. The stiffening members 4 are seen to be arranged on only one side of the wall, which is exemplified as being horizontally oriented, whereby the stiffening members are located at the upper side of the penetrated deck. The wall may be any separating building structure, such as a partition wall, a deck, floor or ceiling.

Example I

In an illustrative and non-limiting example, the present invention was implemented in a wall penetration and passed a standard fire test in accordance with DS/EN 1363-1:2012 in conjunction with EN 1366-1:2014 Part 1. The tested horizontal ventilation duct was a standard type from Lindab type LKR with a width of 1000 mm and a height of 250 mm. The ventilation duct was outwardly insulated with stone wool boards with a black aluminium foil and having a nominal density of 120 kg/m$^3$ and a thickness of 60 mm. The ventilation duct was provided with stiffening members as shown in FIGS. 1, 2 and 4. The stiffening members were U-shaped steel profile with a wall thickness of 1.2 mm and having a height of 26 mm and a width of 60 mm with exterior mounting flanges extending further 25 mm outwards. The stiffening members were attached to the ventilation duct by rivets at each 150 mm. The stiffening members were arranged on all four sides of the ventilation duct approximately 45 mm from each side of a light partition wall with an opening through which the ventilation duct extended. Each stiffening member comprised two fibre gypsum bars, each with a thickness of 12.5 mm. The fibre gypsum bars were glued to the steel profile and to each other by a ceramic glue.

Example II

In another illustrative and non-limiting example, the present invention was implemented in a deck or floor penetration and passed a standard fire test in accordance with DS/EN 1363-1:2012 in conjunction with EN 1366-1: 2014 Part 1. The tested vertical ventilation duct was a standard type from Lindab type LKR with a width of 1000 mm and a height of 250 mm. The ventilation duct was outwardly insulated with stone wool boards with a black aluminium foil and having a nominal density of 70 kg/m$^3$ and a thickness of 60 mm. The ventilation duct was provided with stiffening members as shown in FIGS. 2, 6 and 7 at its long sides above the floor surface, i.e. above the upper side of the deck. The stiffening members were arranged approximately 50 mm above a deck of aerated concrete elements with an opening through which the ventilation duct extended. The stiffening members were U-shaped steel profiles with a wall thickness of 1.2 mm and having a height of 26 mm and a width of 60 mm with exterior mounting flanges extending further 25 mm outwards. The stiffening members were attached to the ventilation duct by rivets at each 150 mm. Each stiffening member comprised two fibre gypsum bars, each with a thickness of 12.5 mm. The fibre gypsum bars were glued to the steel profile and to each other by a ceramic glue.

The ventilation duct was secured and fixed to the deck at the short sides; angle profiles (L-profiles) of 40×40×3 mm were attached to the metal sheet by means of rivets, and to the deck using concrete screws.

Above, the invention is described with reference to some currently preferred embodiments. However, by the invention it is realised that other variants may be provided without departing from the scope described herein.

REFERENCE NUMBERS

1—Ventilation duct metal plates
2—Insulation slabs
2a—Insulation material
3—Wall, deck, floor or ceiling
4—Stiffening members
41—Metal profile
42—Non-combustible bars
43—Glue
44—Mounting flanges
5—Insulation strip
6—Intumescent material
7—Seal
8—Fasteners or rivets

The invention claimed is:

1. A ventilation duct for a fire rated ventilation duct wall penetration, said ventilation duct comprising:
one or more metal sheets forming said duct, wherein said metal sheet duct is covered on an outside by a heat insulating material, and said duct includes elongated stiffening members located on the outside of the duct and attached to said metal sheets;
wherein the stiffening members each comprise a metal profile and at least one non-combustible bar of inorganic material; and
wherein the metal profile is fixed to the metal sheet of the duct and retains the at least one non-combustible bar by at least partly encircling the bar.

2. A ventilation duct according to claim 1, wherein the stiffening members extend transversely to a longitudinal extension of the duct.

3. A ventilation duct according to claim 1, wherein the metal profile is U-shaped with exterior mounting flanges so that a longitudinal groove is provided which is configured to tightly receive the at least one non-combustible bar.

4. A ventilation duct according to claim 1, wherein the at least one non-combustible bar is glued to the metal profile.

5. A ventilation duct according to claim 1, wherein the metal profile is a steel profile.

6. A ventilation duct according to claim 1, wherein the at least one non-combustible bar is based on gypsum, calcium silicate or cement.

7. A ventilation duct according to claim 6, wherein the at least one non-combustible bar does not comprise a heat insulation material.

8. A ventilation duct according to claim 1, wherein the stiffening members are fastened to the metal sheet duct by a plurality of rivets and/or screws.

9. A ventilation duct according to claim 1, wherein the heat insulating material is also arranged on an outside of the stiffening members.

10. A ventilation duct according to claim 1, wherein the heat insulating material is mineral wool.

11. A ventilation duct according to claim 10, wherein the mineral wool is stone wool.

12. A ventilation duct according to claim 1, wherein the duct has a square or rectangular cross-section.

13. A ventilation duct according to claim 1, wherein the stiffening members comprise two or more stiffening members.

14. A ventilation duct according to claim 13, wherein the two or more stiffening members are located along longer sides of the rectangular duct.

15. A ventilation duct according to claim 13, wherein the two or more stiffening members comprise four stiffening members.

16. A ventilation duct according to claim 1, wherein the stiffening members are located along a longer side of the rectangular duct.

17. A ventilation duct according to claim 1, wherein one of the stiffening members is located on each side of the wall penetration.

18. A ventilation duct according to claim 17, wherein the duct is essentially vertically oriented, and the stiffening members are located on an upper side of the wall penetration.

19. A ventilation duct according to claim 17, wherein the duct is essentially vertically oriented, and the stiffening members are located on an upper side of a deck or floor.

20. A ventilation duct according to claim 1, wherein the at least one non-combustible bar comprises two non-combustible bars, the metal profile being U-shaped with exterior mounting flanges so that a longitudinal groove is provided which is configured to tightly receive the two non-combustible bars.

21. A method of manufacturing and installing a ventilation duct in a fire rated ventilation duct wall penetration, said method comprising the steps of:
providing a ventilation duct section comprising one or more metal sheets forming said duct section;
mounting elongated stiffening members located on an outside of the duct section and attached to said metal sheets, wherein the stiffening members each comprises a metal profile and at least one non-combustible bar of inorganic material, wherein the profile is fixed to the metal sheet of the duct section and retains the at least one non-combustible bar by at least partly encircling the bar; and
positioning the ventilation duct section with stiffening members through an opening in a building structure;
covering said metal sheet duct section and the stiffening members with the non-combustible bars by a heat insulating material; and
sealing a gap between an outer surface of the insulation material and the opening in the building structure.

22. A method according to claim 21, wherein the stiffening members extend transversely to a longitudinal extension of the ventilation duct.

23. A method according to claim 21, wherein the metal profile is U-shaped with exterior mounting flanges so that a longitudinal groove is provided which is configured to tightly receive the at least one non-combustible bar.

24. A method according to claim 21, wherein the at least one non-combustible bar is glued to the metal profile.

25. A method according to claim 21, wherein the stiffening members are fastened to the metal sheet duct by a plurality of rivets and/or screws.

26. A method according to claim 21, wherein the heat insulating material is also arranged on an outside of the stiffening members.

27. A method according to claim 21, wherein the heat insulating material is mineral wool.

28. A method according to claim 27, wherein the mineral wool is stone wool.

29. A method according to claim 21, wherein the building structure is a separating building structure, and the wall penetration is through the separating building structure, the separating building structure being either vertical or horizontal in orientation.

30. A method according to claim 21, wherein the gap between the outer surface of the insulation material and the opening in the building structure is sealed with an intumescent which is capable of swelling when exposed to heat.

31. A method according to claim 21, wherein the at least one non-combustible bar comprises two non-combustible bars, the metal profile being U-shaped with exterior mounting flanges so that a longitudinal groove is provided which is configured to tightly receive the two non-combustible bars.

* * * * *